United States Patent [19]

Ryan

[11] Patent Number: 5,262,874
[45] Date of Patent: Nov. 16, 1993

[54] METHOD AND APPARATUS FOR RECORDING AND REPLAYING FIELD-LENGTH-MODULATED VIDEO SIGNALS

[75] Inventor: John O. Ryan, Cupertino, Calif.

[73] Assignee: Macrovision Corporation, Mountain View, Calif.

[21] Appl. No.: 534,391

[22] Filed: Jun. 6, 1990

[51] Int. Cl.⁵ .............................................. H04N 7/16
[52] U.S. Cl. ..................................... 358/335; 358/148; 380/3
[58] Field of Search ............... 358/335, 319, 310, 148, 358/160, 150, 149; 360/37.1, 60; 380/5, 3, 15, 10, 7, 11, 14

[56] References Cited

U.S. PATENT DOCUMENTS

| | | |
|---|---|---|
| 2,547,598 | 4/1951 | Roschke . |
| 2,857,455 | 10/1958 | Jollife . |
| 2,972,008 | 2/1961 | Ridenour . |
| 3,005,869 | 10/1961 | Dolby ............................. 358/148 |
| 4,070,693 | 1/1978 | Shutterly . |
| 4,216,500 | 8/1980 | St. Louis . |
| 4,283,740 | 8/1981 | Okada . |
| 4,353,088 | 10/1982 | den Toonder et al. . |
| 4,378,570 | 3/1983 | Broki ............................ 358/120 |
| 4,390,898 | 6/1983 | Bond et al. . |
| 4,403,252 | 9/1983 | Ragan et al. . |
| 4,405,942 | 9/1983 | Block et al. . |
| 4,533,949 | 8/1985 | Fujimura et al. . |
| 4,547,802 | 10/1985 | Fogarty et al. . |
| 4,563,702 | 1/1986 | Heller et al. ..................... 358/119 |
| 4,568,974 | 2/1986 | den Toonder et al. . |
| 4,575,754 | 3/1986 | Bar-Zohar . |
| 4,598,312 | 7/1986 | Geissler et al. . |
| 4,600,942 | 7/1986 | Field et al. . |
| 4,604,650 | 8/1986 | DelCoco et al. . |
| 4,605,961 | 8/1986 | Fredericksen . |
| 4,803,552 | 2/1989 | Marin . |
| 4,951,315 | 8/1990 | Switsen ........................... 380/15 |
| 5,089,900 | 2/1992 | Yokogawa ...................... 358/338 |

Primary Examiner—Tommy P. Chin
Assistant Examiner—Robert Chevalier
Attorney, Agent, or Firm—Skjerven, Morrill, MacPherson, Franklin & Friel

[57] ABSTRACT

Copy protected video signals employing field-length-modulation (FLM) are effectively recorded by a VCR by stripping the rate-varying vertical sync pulses from the FLM video and reinserting constant rate vertical sync pulses having a rate equal to the mean frequency or half the mean frequency of the FLM sync pulses. Display of the recorded video on a conventional television monitor or set is achieved by removing the constant rate vertical sync pulses and reinstating the rate-varying FLM sync pulses. Timing marks placed at locations of stripped FLM sync pulses are used to position reinserted FLM sync pulses during playback of recorded video. Video gaps created by removed constant rate sync pulses are filled either with video information from a contiguous scan line or a filler signal to improve the appearance of the picture.

26 Claims, 3 Drawing Sheets

METHOD AND APPARATUS FOR RECORDING AND REPLAYING FIELD-LENGTH-MODULATED VIDEO SIGNALS

BACKGROUND OF THE INVENTION

1. Field of the Invention

This invention pertains to video processing and more specifically to a method and an apparatus for recording and playback of a field-length-modulated (FLM) video signal.

2. Description of the Prior Art

As known, FLM video signals cannot be satisfactorily recorded by consumer grade video cassette recorders (VCR's), but such signals can be displayed on a conventional television monitor or set. Field-length-modulation thus serves as one anti-copying measure for cable or broadcast television. FLM encoding essentially consists of varying the field length, e.g., the number of scan lines between vertical sync pulses, of video signals so that a VCR's head drum servomechanism cannot follow the fluctuations, whereas the electronic vertical deflection system of a television display monitor can follow. Variation of field length, typically by up to five scan lines, is performed so that the long-term average number of video lines per frame remains constant.

When an attempt is made to record and playback a FLM signal on a consumer grade VCR, the displayed video exhibits annoying instabilities thereby destroying the entertainment value of the recording and thus deterring pirating, i.e., the making of unauthorized copies. U.S. Pat. Nos. 4,488,176 to Bond, et al. and U.S. Pat. No. 4,673,981 to Lippman, et al. show exemplary FLM encoding systems for video signals.

One approach to defeat FLM encoding would be to remove the field-length-modulation by adding a correct number of scan lines to shortened fields and deleting a number of lines from lengthened fields. Though conceptually straight-forward, a system operating on this principle is relatively expensive requiring complex digital video processing circuitry. High cost and complexity provide a significant deterrent to attempts to defeat FLM video recordings.

SUMMARY OF THE INVENTION

It is an objective of the present invention to provide a relatively inexpensive method and apparatus for recording and playing back FLM video signals with minimal signal degradation.

In accordance with the invention, a method of enabling recording of an FLM video signal includes the steps of effectively removing FLM vertical sync pulses from the video signal and adding vertical sync pulses at a constant frequency, thereby enabling a VCR to record the signal. The resultant recorded signal is improperly framed with respect to the picture (and hence would appear as an unviewable picture on a television set), but is nevertheless recordable by the VCR.

Upon replay of the recorded video signal, the method further includes the steps of removing the added constant frequency sync pulses and restoring FLM vertical sync pulses at their original locations thereby to reframe the video picture and enable a conventional television monitor, which has a fast-response vertical sync circuit, to display the picture correctly.

To carry out the aforementioned method, an apparatus for enabling recording of an FLM video signal by a VCR comprises means for receiving the FLM video signal, means for removing FLM vertical sync pulses, and means for inserting constant frequency vertical sync pulses suitable to synchronize a VCR's head drum servomechanism.

An apparatus for enabling replay of the recorded FLM video signal, which may be combined with the aforementioned recording apparatus, comprises means for removing the added constant frequency vertical sync pulses, and reinsertion means for reconstituting the original FLM vertical sync pulses at their original locations, thereby to recapture proper framing for display on a conventional television monitor. The location of the original FLM vertical sync pulses is marked during such suppression for later reinsertion of new FLM vertical sync pulses. The apparatus may additionally include means to insert other information in place of the constant frequency sync pulses, such as a constant voltage or video information from a contiguous scan line, in order to reduce visual voids in the picture during playback.

A further aspect in accordance with the invention includes a method and apparatus for enabling recording FLM video by a VCR including a step of, and a means for, generating constant frequency sync pulses separate and apart from the FLM video signal and supplying the generated sync pulses to the VCR's head drum servomechanism thereby to establish a servo tracking signal.

A further aspect in accordance with the invention includes a method and apparatus for enabling a VCR to record an FLM video signal by altering the response time of the VCR's head drum servomechanism so that it tracks the average or mean phase of the sync pulses of the FLM video signal.

These and other advantages, features and aspects of the invention will become more readily apparent from this disclosure.

DETAILED DESCRIPTION OF THE INVENTION

Figure 1:
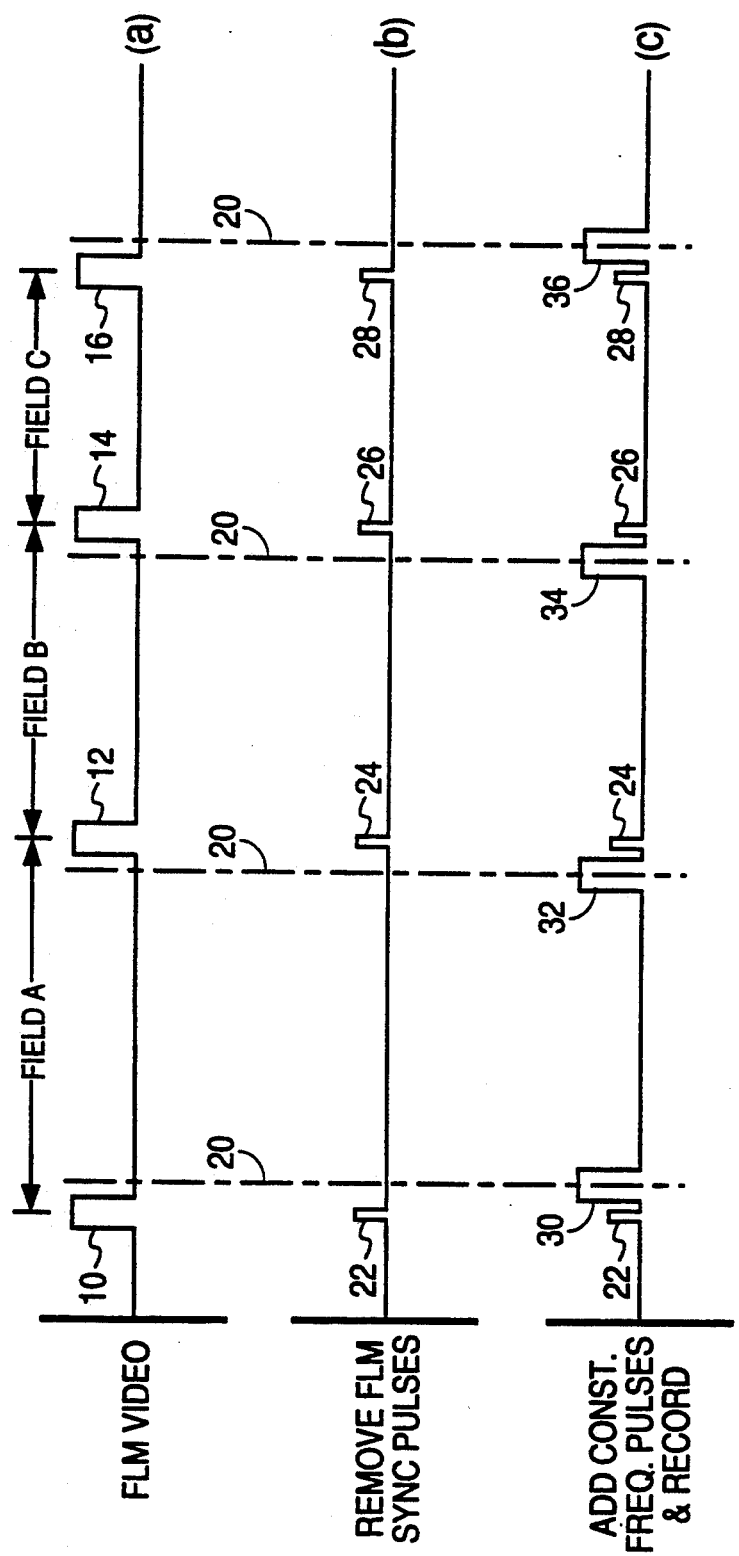
FIG. 1 illustrates FLM signal processing during the recording phase.

FIG. 1, line (a) shows an exemplary FLM video signal having typical picture fields A, B and C separated by vertical sync pulses 10, 12, 14, 16. For purposes of illustration and simplicity, the vertical sync pulses are shown as simple positive pulses 10, 12, 14 and 16 and other features of a normal video signal are deleted. Signals representing picture information contained in the video field are also omitted for purposes of this description.

As indicated, fields A, B and C have different field lengths due to the varying position of the FLM vertical sync pulses 10, 12, 14, 16 relative to mean phase positions 20. A VCR's servomechanism cannot follow the specific pulses 10, 12, 14, 16 due to their varying phase in the video signal. As seen, pulses 10 and 16 lie in advance of mean phase positions 20, while pulses 12 and 14 are delayed from mean phase positions 20. The average phase of the FLM pulses 10, 12, 14, 16, however, is constant and is aligned with the mean phase positions 20. A VCR's servomechanism will not properly lock onto those pulses with the result that the recorded signal will generally be unacceptable for viewing. It is to be understood that while FIG. 1 depicts each field advanced or delayed only by a fraction of a field, in actuality the phasing due to FLM may diverge by as much as several fields from that of the original signal.

An objective of the present invention is to defeat this anti-copying technique. In accordance with the invention, a first step in the recording process includes removing or suppressing FLM vertical sync pulses 10, 12, 14, 16, as shown in FIG. 1, line (b). Pulse suppression of each of the six sync pulses comprising normal vertical sync is achieved by reducing the typical 27.1 microsecond duration to (for example) 4.7 micro-second duration residual pulses represented by 22, 24, 26, 28 as shown in FIG. 1, line (b). These durations are for the example of an NTSC television system. It is to be understood that this is illustrative, and the invention is applicable to other television standards systems, such as PAL and SECAM. The vertical sync circuits of a VCR do not respond to these 4.7 micro-second pulses. These residual pulses 22, 24, 26, 28 mark the location of the original FLM vertical sync pulses and are later used to time the reinsertion or restoration of FLM sync pulses during playback.

The next step in the process includes inserting new constant frequency vertical sync pulses 30, 32, 34, 36 in the video signal, as illustrated in FIG. 1, line (c). It is not necessary to add a full complement of six pulses each of 27.1 micro-second duration (i.e. a standard vertical sync signal) to achieve the desired effect. In practice one broad pulse having a duration of 25 to 100 microseconds is sufficient to synchronize most VCR's. It is desirable to use the minimum pulse width so as to minimize the extent of the 'hole' in the picture caused by the insertion and subsequent removal of these constant frequency pulses. Also, most VCR's will synchronize reliably if this pulse is added only to alternate fields i.e. at a 30 Hertz rate. This further minimizes the visibility of the 'hole'. The processed video signal then contains the 4.7 micro-second duration residual pulses 22, 24, 26, 28 and the constant frequency sync pulses 30, 32, 34, 36. The signal of FIG. 1, line (c) can now be recorded by a conventional VCR since the servomechanism thereof is able to lock onto the constant frequency sync pulses 30, 32, 34, 36.

Figure 2:
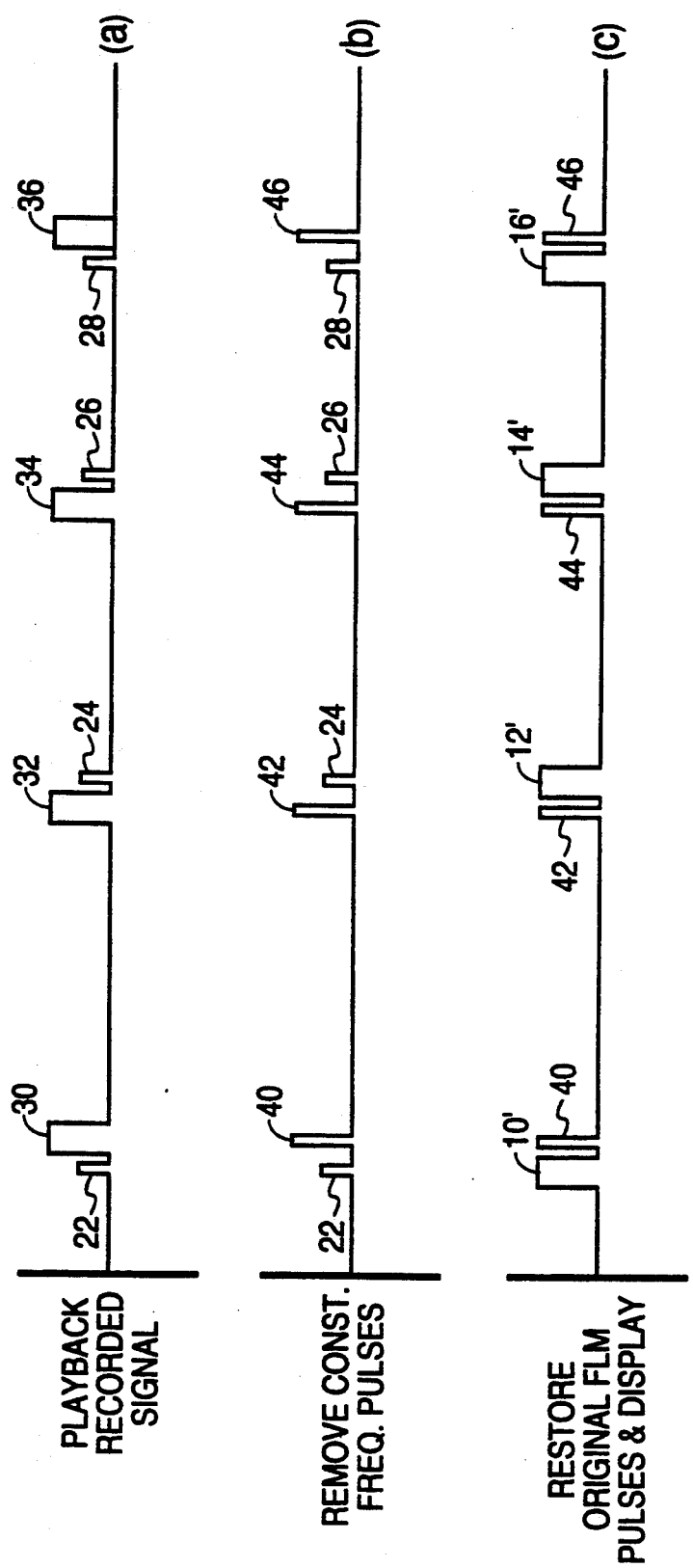
FIG. 2 illustrates FLM signal processing during the playback stage.

In the playback phase, FIG. 2 illustrates reprocessing of the recorded FLM video signal so that the information may be displayed for acceptable viewing on a conventional television. FIG. 2, line (a) depicts reproduction of the video signal that was previously recorded, as shown in FIG. 1, line (c). A next step in the playback phase includes completely removing the constant frequency sync pulses 30, 32, 34, 36. Next, the residual pulses 22, 24, 26, 28 created in the recorded video, as shown in FIG. 2, line (b), are reconverted back to FLM sync signals 10', 12', 14', 16' as shown in FIG. 2, line (c). FLM sync pulses 10' to 16' correspond to original FLM sync pulses 10 to 16 as shown in FIG. 1, line (a). The picture information in the video signal is now properly framed with respect to sync pulses 10' to 16', and may be displayed on a conventional television set which rapidly responds to the FLM fluctuations in phase.

There is, however, a "hole" in the picture caused by the insertion and removal of the constant frequency pulses. Although this hole is minimized by using the shortest possible pulse and adding it only at a 30 Hertz rate, the extent of this picture degradation may be further reduced by replacing the missing video with a constant voltage signal which is an average of the video in and about the displayed region. Alternatively, the missing video may be replaced with a signal from a contiguous scan line, much as a drop-out compensator operates. In this fashion, the visual character or quality of the video is improved.

Figure 3:
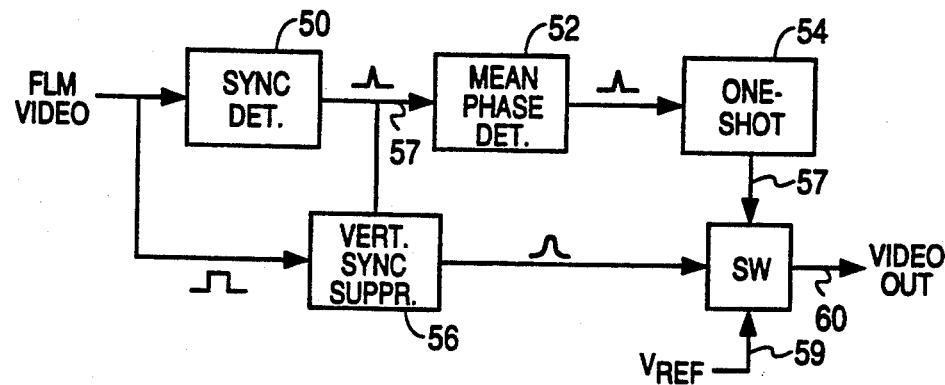
FIG. 3 is a block diagram of an apparatus for processing FLM video signals during the recording phase of FIG. 1.

FIG. 3 illustrates an apparatus for carrying out the FLM sync pulse recording process described with respect to FIG. 1. The recording apparatus includes sync detector 50 for detecting vertical sync pulses, a mean phase detector 52 (such as a conventional narrow band phase-locked loop having a long response time of typically one second or longer) for determining the mean phase of detected sync pulses, a one-shot multivibrator 54 for generating via switch 58 constant width vertical sync pulses for insertion into the video signal, and a vertical sync suppressor 56 for suppressing or removing the original FLM video vertical sync pulses. The apparatus also includes switch (i.e. gate) 58 which as controlled by control line 57 switches between a new vertical sync provided by $V_{REF}$ on line 59 representing a sync tip reference voltage and the suppressed sync video from vertical sync suppressor 56. Switch 58 has its output 60 fed directly to a video recorder. The system operates as follows.

An FLM video signal (FIG. 1, line (a)) from a broadcaster or other source is supplied to sync detector 50 and to sync suppressor 56. Sync detector 50 produces pulses corresponding to the detected vertical sync pulses 10, 12, 14, 16 and supplies pulses on line 51 to mean phase detector 52. Mean phase detector 52 then conventionally calculates a mean phase or timing sequence for generating constant frequency vertical sync pulses 30, 32, 34, 36. Sync suppressor 56 reduces or suppresses the original FLM sync pulses 10, 12, 14, 16 by converting pulses 10, 12, 14, 16 to smaller (i.e., shorter) residual pulses 22, 24, 26, 28 which remain in the video signal along with the other components of the video signal. Residual pulses 22, 24, 26, 28 are later used during the playback stage as marker pulses to reinsert or restore FLM sync pulses during the display process.

Timing pulses from mean phase detector 52 on output line 53 trigger one-shot multivibrator 54 which, in turn, generates (from voltage reference $V_{REF}$) constant frequency vertical sync pulses 30, 32, 34, 36 via switch 58 and its output line 60, as explained above. Consequently, the video information on output line 60 is readily recordable by a conventional consumer grade VCR.

Figure 4:
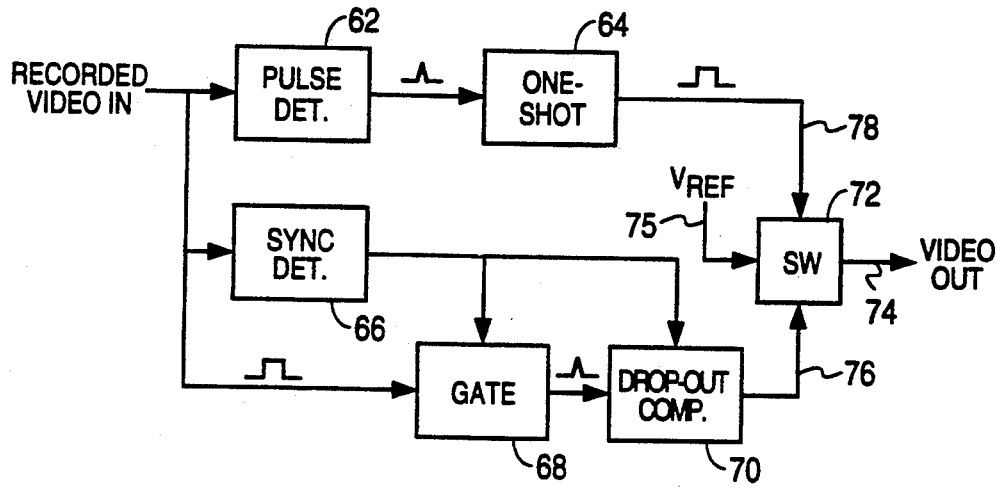
FIG. 4 is a block diagram of an apparatus for the reprocessing recorded video signals during the playback phase of FIG. 2.

FIG. 4 illustrates a block diagram of an apparatus for use during playback of a signal recorded by the apparatus of FIG. 3. The playback apparatus includes a pulse detector 62 for detecting the residual pulses 22, 24, 26, 28 (FIG. 3), a one-shot multivibrator 64 for regenerating FLM vertical sync pulses 10', 12', 14', 16', a sync detector 66 for detecting the added constant frequency vertical sync pulses 30, 32, 34, 36 in the video signal, a gate 68 for removing pulses 30, 32, 34, 36, an optional drop-out compensator 70 for enhancing picture quality by filling voids left by the removed constant frequency sync pulses 40, 42, 44, 46, and a switch (i.e., gate) 72 controlled by line 78 for alternatively switching an output line 74 between video information from the video path 76 and sync signals provided by $V_{REF}$ representing a sync tip reference voltage on line 75, thus creating by use of $V_{REF}$ and switch 72 sync pulses 10', 12', 14', 16' during the vertical blanking period.

The playback apparatus operates as follows. A recorded FLM video signal as shown in FIG. 2, line (a) is supplied to pulse detector 62, sync detector 66 and sync suppressor 68. Pulse detector 62 detects the residual (marker) pulses 22 to 28 and thereby drives one-shot multivibrator 64 to regenerate FLM vertical sync pulses 10', 12', 14', 16' at the locations of the original FLM vertical sync pulses. One-shot multivibrator 64 supplies these standard vertical sync pulses 10', 12', 14', 16' on an output line 78 which is connected to the video display monitor (not shown) via switch 72. Sync detector 66 detects the constant frequency sync pulses 30, 32, 34, 36 in the recorded video and generates timing pulses for driving sync suppressor 68 and drop-out compensator 70. Sync suppressor 68 receives the input video signal, and at each occurrence of a detected vertical sync signal 30, 32, 34, 36 by detector 66, removes that sync signal. Optional dropout compensator 70 (which comprises one or more lines of conventional video memory) fills in the locations of removed sync pulses 40, 42, 44, 46 with video from the previous line thereby filling the "hole" left by the suppressed sync pulses 40, 42, 44, 46.

As indicated above, the voids left by each of the removed pulses 40, 42, 44, 46 are filled either by adding a constant voltage signal to improve picture quality or by adding video information from a previous line. Dropout compensator circuit 70 stores successive scan lines and effects replacement of the information at the locations of pulses 40, 42, 44, 46 with information from the previous scan line, and supplies the corrected video on an output line 74 via switch 72. Accordingly, output line 74 carries information which may be readily displayed by a conventional television monitor. Since the original FLM sync pulses 10, 12, 14, 16 have been reinserted at the proper locations, the frames are properly phased with the originally encoded FLM video. Because the electronic phasing system of television monitor responds rapidly, the picture can be displayed in spite of the FLM video presence.

It is also possible to record FLM video signals with another apparatus. As known, FLM video cannot usefully be recorded by a consumer grade VCR because the servomechanism cannot respond to the rapid fluctuations in frame length. In order to overcome the difficulty of recording, a set of constant frequency sync pulses are generated externally of the VCR, or separate and apart from the FLM video, and are then supplied to the VCR for use by the VCR's servomechanism during the recording of FLM video. By this method, the FLM video signal is recorded quite easily. Alternatively, in another method the response time of the VCR's servomechanism is altered so that the servomechanism does not attempt to follow the rapid fluctuations of frame length of FLM video, but instead, stabilizes on the mean or average phase of the FLM video sync pulses. In this fashion, it is again seen that the stabilized servomechanism provides adequate recording of FLM video.

Figure 5:
FIG. 5 is a block diagram for another apparatus for processing FLM video signals during recording.

An apparatus for carrying out the first of the two other methods includes a detector for detecting and determining mean phase of the FLM vertical sync pulses and for generating a constant frequency sync pulse based upon the mean phase thereof, and a means for supplying a constant frequency sync pulses to the VCR's servomechanism. An example of such an apparatus as shown in FIG. 5 includes a conventional sync separator 82 for separating out sync signals, a vertical sync detector 84 for detecting the resulting FLM vertical sync pulses, and a 30 Hertz phase-locked loop oscillator 86 controlled by the output of vertical sync detector 84. Oscillator 86 has a bandwidth of about ¼ Hertz to ensure that it does not lock onto rapidly varying FLM sync signals.

In another embodiment, a sync timer not dependent on the incoming FLM video generates and supplies sync signals to the VCR servomechanism. In this embodiment the apparatus includes means for altering or slowing down response time of the VCR's servomechanism, such as by changing the resistor-capacitor network of the servo controller so that its response time is degraded to one second or more.

Modifications, alterations and other variations of the invention will be apparent to those skilled in the art in view of the above teachings. For example, the pulse widths of the sync signals and the suppressed or reduced pulses may vary. Other means can also be employed to reduce or suppress the effectiveness of the original sync pulses, such as blanking them all together. Also, the order of steps in processing the FLM video may vary. Accordingly, it is intended that the appended claims embrace all such modifications, adaptations and variations.

What is claimed is:

1. A method for recording of a field-length-modulated video signal having variable rate vertical sync pulses defining video fields in said field-length-modulated video signal, said method comprising the steps of:
   partially suppressing said variable rate vertical sync pulses of said field-length-modulated video signal while leaving detectable portions of said variable rate vertical sync pulses in said field-length-modulated video signal;
   providing a plurality of constant frequency sync pulses suitable for phase-locking a servomechanism of a video signal recorder; and
   inserting said plurality of constant frequency sync pulses in said field-length-modulated video signal resulting from the partially suppressing step.

2. A method as in claim 1 wherein said plurality of constant frequency sync pulses have a frequency substantially equal to a mean frequency of said variable rate vertical sync pulses.

3. A method as in claim 1 wherein said constant frequency sync pulses have a frequency substantially equal to one half of a mean frequency of said variable rate vertical sync pulses.

4. A method as in claim 1 further including, in the partially suppressing step, the steps of:
   generating a plurality of marking pulses; and
   replacing the partially suppressed variable rate vertical sync pulses with said plurality of marking pulses which do not have an effect of the replaced variable rate vertical sync pulses on said video signal recorder, while providing an indication of a location of each replaced variable rate vertical sync pulse.

5. A method for recording of a field-length-modulated video signal having variable rate vertical sync pulses defining video fields in said field-length-modulated video signal, said method comprising the steps of:

suppressing an effect of said variable rate vertical sync pulses on a video signal recorder;

generating a plurality of marking pulses, wherein said marking pulses each comprise a pulse of less duration than said variable rate vertical sync pulses;

replacing said variable rate vertical sync pulses with said marking pulses which do not have the effect of said replaced variable rate vertical sync pulses on said video signal recorder, while providing an indication of a location of each replaced variable rate vertical sync pulse;

providing a plurality of constant frequency sync pulses suitable for phase-locking a servomechanism of said video signal recorder; and inserting said plurality of constant frequency sync pulses in the field-length-modulated video signal resulting from the replacing step.

6. A method as in claim 4 wherein said plurality of marking pulses each comprise a pulse of less duration than said variable rate vertical sync pulses.

7. A method for enabling recording by a video signal recorder and playback on a television of a field-length-modulated video signal having variable rate vertical sync pulses defining video fields in said field-length-modulated video signal, said method comprising the steps of:

suppressing an effect of said variable rate vertical sync pulses on said video signal recorder;

marking a plurality of locations of said variable rate vertical sync pulses;

providing a set of constant frequency sync pulses suitable for phase-locking a servomechanism of said video signal recorder;

inserting said set of constant frequency sync pulses in the field-length-modulated video signal resulting from the step of marking;

recording the field-length-modulated video signal after the inserting step utilizing said constant frequency sync pulses;

thereafter suppressing said set of constant frequency sync pulses; and after the last-mentioned suppression step, reinserting variable rate vertical sync pulses in the field-length-modulated video signal at marked locations defined by the marking step, thereby enabling said television to display the field-length-modulated video signal at a proper framing sequence.

8. A method as in claim 7 wherein the suppressing step comprises the step of suppressing said variable rate vertical sync pulses.

9. A method as in claim 8 further including, in the marking step, the step of placing a narrow-width pulse at respective locations of said suppressed variable rate vertical sync pulses thereby allowing reinserting of variable rate vertical sync pulses at the respective locations.

10. A method as in claim 7 further including the steps of:

generating a predetermined signal derived from said field-length-modulated video signal; and replacing the constant frequency sync pulses with said predetermined signal.

11. A method as in claim 10 wherein said predetermined signal comprises video information from a contiguous scan line of a field-length-modulated video frame.

12. A method as in claim 10 wherein said predetermined signal comprises a signal having substantially constant level equal to an average video level of a particular number of preceeding video lines.

13. A method as in claim 7 wherein the frequency of said constant frequency sync pulses is equal to one-half of a mean frequency of said variable rate vertical sync pulses.

14. A method as in claim 8 wherein the frequency of said constant frequency sync pulses is equal to a mean frequency of said variable rate vertical sync pulses.

15. A method of recording a field-length-modulated video signal by a recorder which uses a head controlled by a head servomechanism to record on a medium, said recorder utilizing synchronizing pulses for writing video framing information onto said medium, and said field-length-modulated video signal including a plurality of rate-varying vertical framing pulses for defining respective frames in said field-length-modulated video signal, said method comprising the steps during the recording process of:

partially suppressing said rate-varying vertical framing pulses in said field-length-modulated video signal while leaving detectable portions of said rate-varying vertical framing pulses in said field-length-modulated video signal;

generating a plurality of constant rate framing pulses approximating a mean frequency of said rate-varying vertical framing pulses; and applying said plurality of constant rate framing pulses to said head servomechanism to enable recording of the partially suppressed field-length-modulated video signal onto said medium.

16. A method of recording a field-length-modulated video signal by a recorder on a medium, said recorder including a servomechanism responsive to vertical framing sync pulses for controlling recording head positioning of said recorder with respect to said medium, said field-length-modulated video signal including rate-varying vertical framing sync pulses for defining respective frames in said field-length-modulated video signal, said method comprising the step of stabilizing a response time of said servomechanism with an average frequency of said rate-varying vertical framing sync pulses, said stabilizing step including the step of partially suppressing said rate-varying vertical framing sync pulses while leaving detectable portions of said rate-varying vertical framing sync pulses in said field-length-modulated video signal, thereby enabling said recorder to write video information onto said medium free of servo tracking errors.

17. An apparatus for recording field-length-modulated video signal having vertical sync pulses by a video recorder comprising:

means for partially suppressing said vertical sync pulses from said field-length-modulated video signals while leaving detectable portions of said vertical sync pulses in said field-length-modulated video signals;

means for providing a plurality of constant frequency sync pulses;

means for inserting said plurality of constant frequency sync pulses into the partially suppressed said field-length-modulated video signals; and means for providing the partially suppressed field-length-modulated video signals having the inserted constant frequency sync pulses to said video recorder.

18. An apparatus for recording field-length-modulated video signal having variable rate vertical sync pulses, by a video recorder comprising:
   means for suppressing said variable rate vertical sync pulses from said field-length-modulated video signals;
   means for providing a plurality of constant frequency sync pulses;
   means for inserting said plurality of constant frequency sync pulses into the suppressed field-length-modulated video signals;
   means for providing the suppressed field-length-modulated video signals having the inserted constant frequency sync pulses to said video recorder;
   means for suppressing said inserted constant frequency sync pulses from their locations in the suppressed field-length-modulated video signals;
   means for detecting the suppressed variable rate vertical sync pulses;
   means for reinserting a plurality of variable rate vertical sync pulses at the locations from which said variable rate vertical sync pulses were suppressed; and
   means for supplying the field-length-modulated video signals after the reinsertion of said plurality of variable rate vertical sync pulses to a television.

19. An apparatus as in claim 17 further comprising means for marking a plurality of locations in said field-length-modulated video signals of the partially suppressed vertical sync pulses.

20. An apparatus for recording field-length-modulated video signals having vertical sync pulses by a video recorder comprising:
   means for suppressing said vertical sync pulses from said field-length-modulated video signals;
   means for providing a plurality of constant frequency sync pulses;
   means for inserting said plurality of constant frequency sync pulses into said suppressed field-length-modulated video signals;
   means for providing the field-length-modulated video signals having the inserted plurality of constant frequency sync pulses to said video recorder;
   means for marking locations in said field-length-modulated video signals of said suppressed vertical sync pulses;
   means responsive to the marked locations for regenerating a plurality of vertical sync pulses and for reinserting the regenerated vertical sync pulses in said suppressed field-length-modulated video signals.

21. An apparatus as in claim 18 further comprising:
   means for providing a filler signal; and
   means for inserting said filler signal at the locations of the suppressed constant frequency sync pulses thereby to improve picture quality.

22. An apparatus as in claim 21 further including means for generating information from a previous scan line in said field-length-modulated video signals and for inserting said information at the location of the suppressed constant frequency sync pulses.

23. An apparatus for recording field-length-modulated video signals having a plurality of vertical sync pulses, by use of a video recorder having a servomechanism comprising:
   means for partially suppressing said vertical sync pulses while leaving detectable portions of said vertical sync pulses in said field-length-modulated video signals;
   means for determining a mean phase of said partially suppressed vertical sync pulses in the partially suppressed field-length-modulated video signals;
   means for generating a plurality of constant frequency vertical sync pulses having a frequency which is a function of said means phase; and
   means for providing said plurality of constant frequency vertical sync pulses to said servomechanism, thereby phase locking said servomechanism thereto.

24. An apparatus for recording field-length-modulated video signals having vertical sync pulses by a video recorder comprising:
   a sync suppressor for partially suppressing said vertical sync pulses from said field-length-modulated video signals while leaving detectable portions of said vertical sync pulses in the partially suppressed field-length-modulated video signals;
   a pulse generator for providing a plurality of constant frequency sync pulses suitable for phase-locking a servomechanism of said video recorder; and
   a switch for inserting said plurality of constant frequency sync pulses into the partially suppressed field-length-modulated video signals.

25. An apparatus for recording field-length-modulated video signals having vertical sync pulses by a video recorder comprising:
   a suppressor for suppressing said vertical sync pulses from said field-length-modulated video signals;
   a pulse generator for providing a plurality of constant frequency sync pulses suitable for phase-locking a servomechanism of said video recorder;
   a switch for inserting said plurality of constant frequency sync pulses into the suppressed field-length-modulated video signals;
   means for providing said suppressed field-length-modulated video signals having said constant frequency sync pulses to said video recorder for recording;
   a gate for suppressing said constant frequency sync pulses from the recorded suppressed field-length-modulated video signals;
   a pulse detector for detecting the suppressed vertical sync pulses;
   a switch for reinserting a plurality of vertical sync pulses at the locations from which said vertical sync pulses were suppressed; and
   means for supplying said suppressed field-length-modulated video signals having the reinserted plurality of vertical sync pulses to a television.

26. An apparatus for displaying recorded field-length-modulated video signals having a plurality of partially suppressed vertical sync pulses and a plurality of inserted constant frequency sync pulses, on a television comprising:
   a gate for suppressing said plurality of inserted constant frequency sync pulses from said recorded suppressed field-length-modulated video signals;
   a pulse detector for detecting said plurality of partially suppressed vertical sync pulses;
   a switch for reinserting a plurality of variable rate vertical sync pulses at locations of said plurality of partially suppressed variable rate vertical sync pulses; and
   means for supplying a resulting field-length-modulated video signals having the reinserted plurality of variable rate vertical sync pulses to a television.

* * * * *